Figure 1:
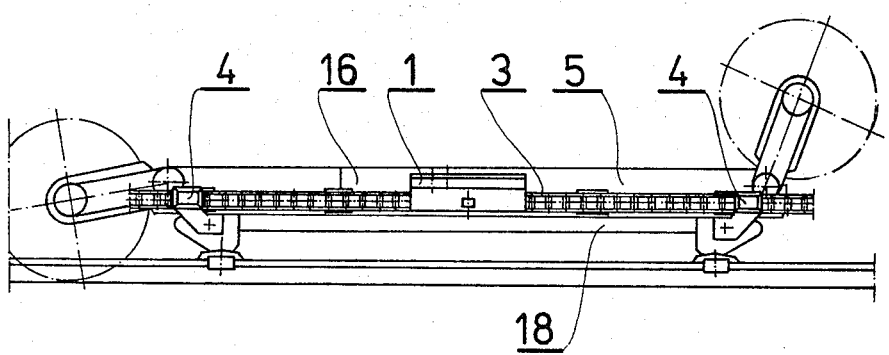

United States Patent [19]

Pilarski et al.

[11] 4,357,052

[45] Nov. 2, 1982

[54] DEVICE FOR DIRECTING THE RACK

[75] Inventors: Klemens Pilarski, Gliwice; Stefan Ulczok, Katowice; Stanislaw Walkiewicz; Wincenty Rudnicki, both of Gliwice, all of Poland

[73] Assignee: Centrum Konstrukcyjno-Technologiczne Maszyn Gorniczynch "KOMAG", Gliwice, Poland

[21] Appl. No.: 197,824

[22] Filed: Oct. 17, 1980

[30] Foreign Application Priority Data

Nov. 29, 1979 [PL] Poland .................................. 219976

[51] Int. Cl.³ .......................................... E21C 29/04
[52] U.S. Cl. .................................................. 299/42
[58] Field of Search ................................ 299/32–34, 299/42, 43, 51–54; 105/29 R

[56] References Cited

U.S. PATENT DOCUMENTS 4,088,370  5/1978  Jarvis et al. ............................ 299/43
4,184,715  1/1980  Lanfermann .......................... 299/43

FOREIGN PATENT DOCUMENTS 2709153  9/1978  Fed. Rep. of Germany ........ 299/43
104524  12/1979  Poland .

Primary Examiner—Ernest R. Purser

[57] ABSTRACT

The subject of this invention is a device for directing the rack of a tieless feed gear to co-operation with the driving wheel of a mining machine.

The guide shoe (1) is provided with an external slipper (6) and an internal slipper (7), whereby the distance between the slippers is approximately equal to the diameter of the pins (8) of the rack (3), and their height is approximately equal to the distance between the upper (11) and the lower (12) blade of the rack (3).

The internal slipper (7) of the guide shoe (1) is mounted immediately to the body (15) of the traction machine (16) on both sides of the wheel (2). The external slipper (6) is mounted to the body (13) of the guide shoe (1), said body (13) being mounted to the body (15) of the traction machine (16) by means of pins (17).

4 Claims, 5 Drawing Figures

DEVICE FOR DIRECTING THE RACK

This invention relates to a device for directing the rack of a tieless feed gear to co-operation with the driving wheel of a tractor of a mining machine.

A device for directing the rack of a tieless feed gear, known from the Polish Patent Specification No 104 524 is provided with a rack, each section whereof being mounted rotatively and slidably in a holder, which in turns is rotatively and slidably mounted in the foot. The rack sections are interconnected by means of a rotative and slidable connection and are provided with forced guiding by means of guide shoes, and the driving wheel of the gear shows a horizontal axis.

The reaction forces generated as a result of meshing of teeth of the driving wheel with the rack pins are from said pins transmitted immediately over support blades into slippers of the guide shoe. The necessity of providing the rack with supporting blades causes an increase of its overall dimensions, of weight, and makes difficult the manufacturing process.

The object of the invention is to secure a proper cooperation of the driving wheel of the traction machine mounted by articulation and deflectably to the track of the conveyor.

According to the invention, said object is achieved by providing a device wherein the guide shoe is provided with internal and external slippers, whereby the distance between said slippers is approximately equal to the diameter of the rack pins, and the height of the slippers is equal to the distance of the upper and the lower blade of the rack. The internal slipper of the guide shoe is mounted directly to the body of the traction machine, and the external slipper, having a recess, is mounted to the body of the guide shoe, which body is mounted to the body of the traction machine by means of pins.

According to the invention, the bearing surfaces of the guide shoe slippers contact immediately the rack pins, which permits to carry over the component force resulting, from meshing, acting transversely to the rack, directly by the guide shoe slippers situated on the opposite side of the driving, toothed wheel. That makes it unnecessary to use bearing blades in the rack, and thus makes the manufacturing of the tieless feed gear of a mechanical miner considerably less expensive, when taking into consideration that for one mechanical miner the rack length equals about 200 m.

Figure 2:
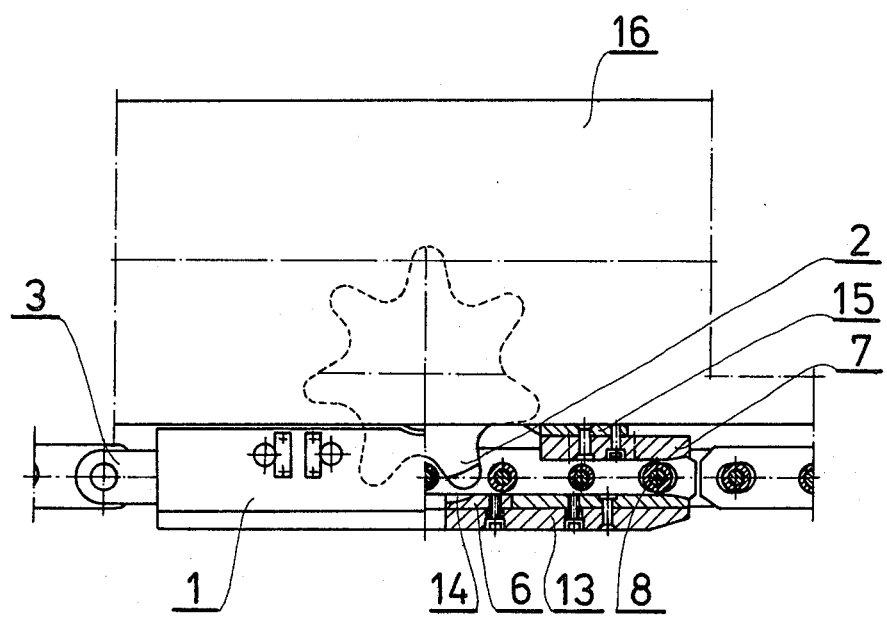
Figure 3:
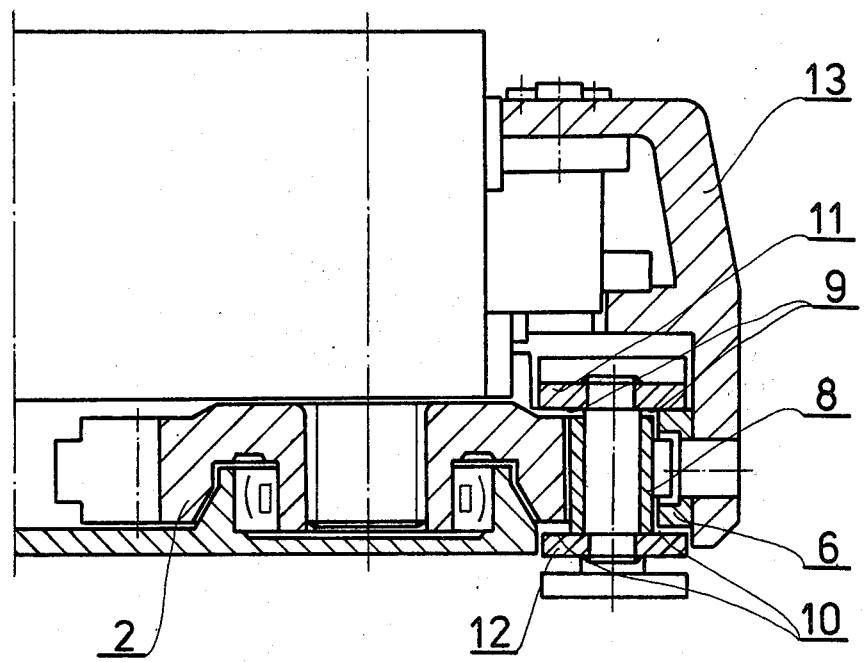
Figure 4:
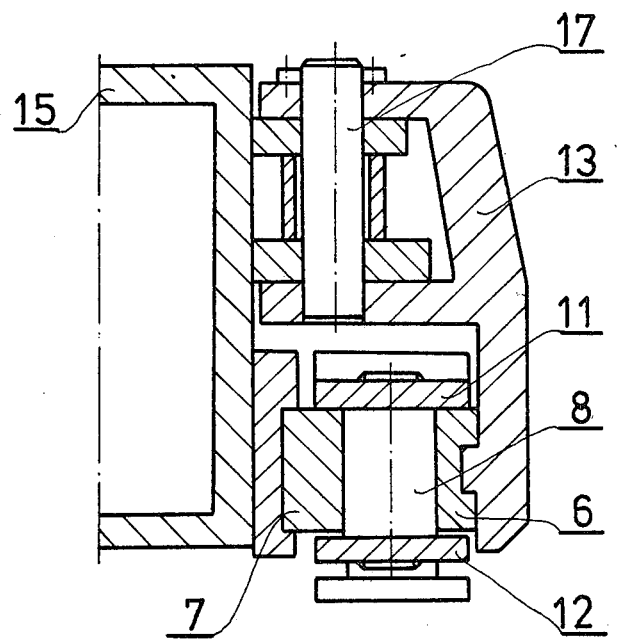
Figure 5:
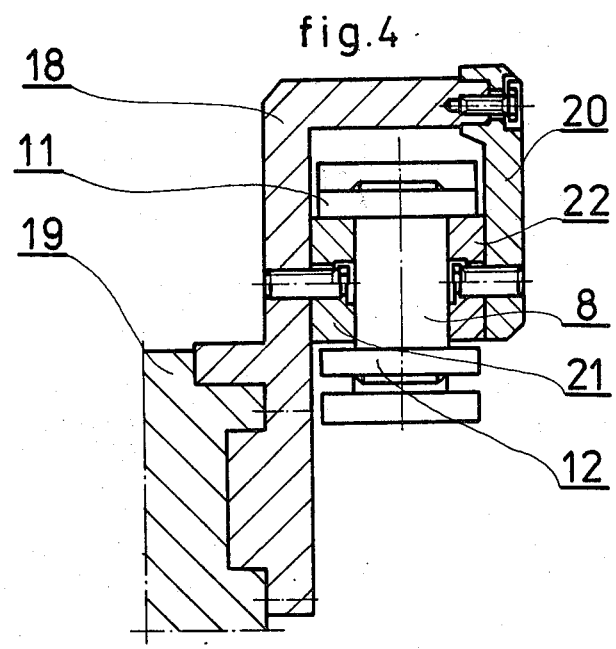

The subject of the invention is presented in form of an exemplary embodiment with reference to the accompanying drawing, wherein:

FIG. 1 shows the elements of the device on a mechanical miner,

FIG. 2 is a half-view of the central element of the device, and a half-sectional view of said element in co-operation with the rack, FIG. 3 is the cross-sectional view of the central element of the device and the driving wheel of the traction machine, FIG. 4 is the cross-sectional view of the central element of the device at the place of fitting it to the traction machine body, and FIG. 5 is the cross-sectional view of the extreme element of the device.

The essential element of the device for directing the rack of a tieless feed gear is the central guide shoe 1 securing a proper co-operation of the driving wheel 2 with the rack 3. The extreme guide shoes 4 are used for preliminary directing the rack 3, and for limiting its transverse motions within the mechanical miner 5. The central guide shoe 1 has an external slipper 6 and two internal slippers 7 co-operating immediately with pins 8 of the rack 3, and holding the rack 3 at proper distance from the driving wheel 2. The slippers 6 and 7 of the guide shoe 1 co-operate also with internal surfaces 9 and 10 of upper and blade 11, 12, respectively 3, holding the rack 3 in position making possible the entry of the teeth of the wheel 2 between the blades 11 and 12 of the rack 3. The height of the slippers 6, 7 of the guide shoe 1 is smaller than the distance between the blades 11 and 12, and larger than the width of the teeth of wheel 2. That makes impossible a friction of the front faces of teeth of the wheel 2 against blades 11 and 12 of the rack 3. The slipper 6 is connected with the body 13 of the guide shoe 1 by means of screws and pins in order to enable an exchange in case of wear of the bearing surface. The internal slipper 6 is in its central portion provided with a recess 14 for receiving the tooth tips of the wheel 2, whereby the height of the recess is smaller than the height of the slipper 6, which makes possible the suuporting of pins 8 against the slipper 6 also within the area of meshing of wheel 2 with pins 8. With respect to simplification of the manufacturing it is preferable to divide the slipper 6 into three parts. The internal slippers 7 are screwed immediately to the body 15 of the traction machine 16 from both sides of the wheel 2. The body 13 of the guide shoe 1 is factened to the body 15 of the traction machine 16 by means of pins 17. The extreme guide shoes 4 are with their mounts 18 fastened to the body of the mechanical miner slide 19.

Each guide shoe 4 consists of the mount 18 and the strap 20 and of the internal slipper of the extreme guide shoe 21, and of the external slipper of the extreme guide shoe 22, co-operating with the pins 8 and the blades 11 and 12 of the rack 3.

What is claimed is:

1. A device for directing the rack of a tieless feed gear to cooperate with a toothed driving wheel of a mining machine, said rack having a plurality of cylindrical pins, and a first and a second blade, said device comprising a guide shoe provided with an oblong external slipper and at least one oblong internal slipper, the distance between said slippers equaling approximately the diameter of the pins of the rack, and the slippers having a height equaling approximately the distance between the first and second blade of the rack.

2. A device as defined in claim 1, wherein said external slipper is provided with a recess for receiving the tooth tips of said toothed wheel, the height of said recess being smaller than the height of said external slipper.

3. A device as defined in claim 1, wherein there are two internal slippers of said guide shoe and they are mounted directly to a body of a traction machine on opposite sides of said wheel and said external slipper is mounted to said guide shoe, said guide shoe being mounted to the body of said traction machine by means of pins, the plane defined by the longitudinal axes of said slippers coincides approximately with the transverse plane of said wheel, and the plane dividing the distance between said external and internal slippers into halves being approximately tangential to said driving wheel.

4. A device defined in claim 1, comprising additional guide shoes situated at the ends of the mining machine and mounted laterally of the mining machine, each of said additional guide shoes comprising a mount, a strap, an additional internal slipper and an additional external slipper, the distance between said additional slippers being approximately equal to the diameter of said pins of said rack, the height of said additional slippers being smaller than the distance between said first and second blade of said rack.

* * * * *